No. 752,870. PATENTED FEB. 23, 1904.
J. W. SMITH.
SHOCK BINDER.
APPLICATION FILED SEPT. 10, 1903.
NO MODEL.

No. 752,870. Patented February 23, 1904.

UNITED STATES PATENT OFFICE.

JAMES W. SMITH, OF MOGADORE, OHIO.

SHOCK-BINDER.

SPECIFICATION forming part of Letters Patent No. 752,870, dated February 23, 1904.

Application filed September 10, 1903. Serial No. 172,601. (No model.)

*To all whom it may concern:*

Be it known that I, JAMES W. SMITH, a citizen of the United States, residing at Mogadore, in the county of Summit and State of Ohio, have invented new and useful Improvements in Shock-Binders, of which the following is a specification.

My invention relates to improvements in shock-binders, more particularly a device for compressing a shock of grain preparatory to binding the same.

The object of the invention is to provide a simple and thoroughly efficient device of this kind; and with this object in view it consists in an arrangement and combination of parts hereinafter described and claimed.

Figure 1:
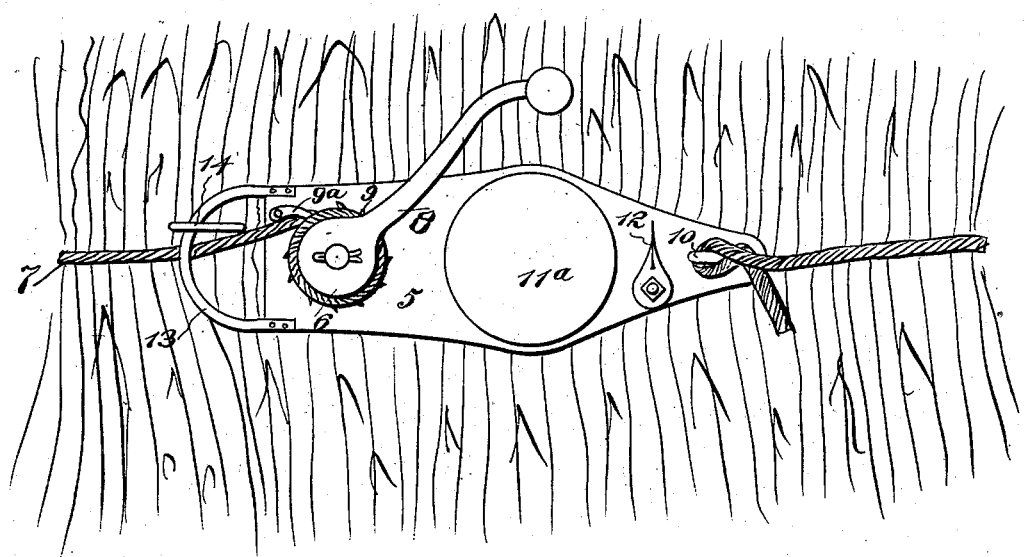
Figure 2:
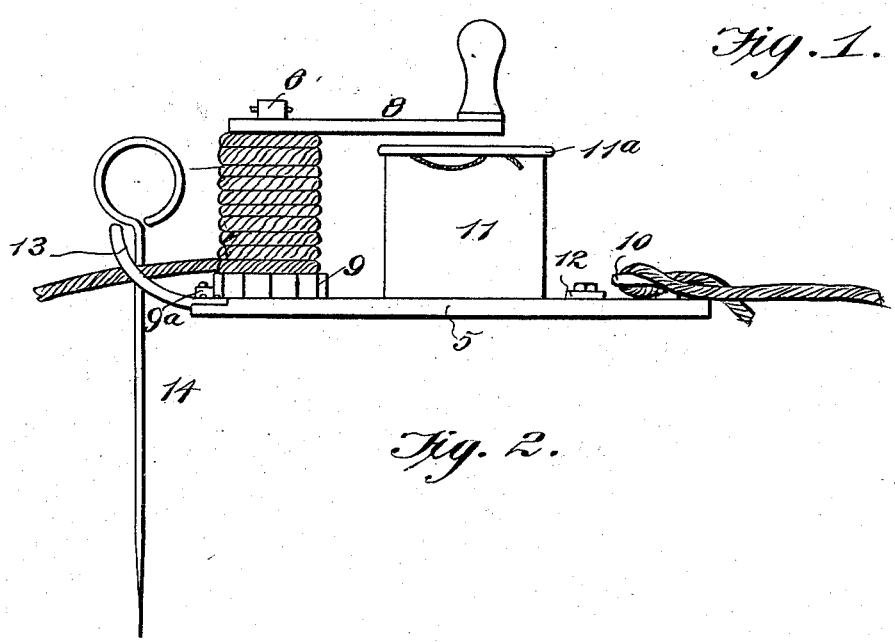

In the accompanying drawings, Figure 1 is a side elevation of the device, showing the application thereof. Fig. 2 is an edge view.

Referring specifically to the drawings, 5 indicates a base plate or board having near one end thereof a spool 6, on which the rope 7 is wound. The spool has a crank 8 for turning it and a ratchet 9 and pawl $9^a$ to prevent it slipping back when the rope is wound up. On the opposite end of the base-plate a cleat 10 is secured, to which the free end of the rope is fastened. A box 11, having a cover $11^a$, is secured to the base-plate between the spool and the cleat, said box carrying twine for binding the shock after it is compressed.

At 12 is indicated a knife bolted to the base-plate for the purpose of cutting the twine after the shock is bound. From the end of the base-plate and adjacent to the spool a bail 13 projects outwardly and upwardly, through which the rope 7 passes, the object being to guide the same and hold it in proper position as it encircles the shock.

To hold the device on the shock while the rope is being passed around it, I employ a pin 14, which is stuck through the bail into the shock.

In operation the device is placed against the shock and pinned thereto, as above described. The rope is then passed around the shock and its free end fastened to the cleat. It is then wound up on the spool until the shock is sufficiently compressed, after which it is bound and the twine cut. The rope is then removed and the device is ready for operation on another shock. It is extremely simple and easy to operate, and by its use the shocks are readily and rapidly tied.

What I claim as new, and desire to secure by Letters Patent, is—

1. A shock-binder comprising a base-plate having at one end an upwardly and outwardly projecting bail, a pin extensible therethrough, a spool, a rope carried by the spool, and a cleat for securing the free end of the rope.

2. A shock-binder comprising a base-plate having at one end an upwardly and outwardly projecting bail, and at the opposite end a cleat, a pin extensible through the bail, a spool adjacent to the bail having a crank, a pawl and ratchet for the spool, and a rope on the spool having its free end secured in the cleat.

In testimony whereof I have signed my name to this specification in the presence of two subscribing witnesses.

JAMES W. SMITH.

Witnesses:
ALBERT HALE,
ELLA L. HALE.